United States Patent
Magyar

(10) Patent No.: US 6,312,053 B1
(45) Date of Patent: Nov. 6, 2001

(54) RECLINER ASSEMBLY

(75) Inventor: Joseph J. Magyar, Fenton, MI (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 09/445,377

(22) PCT Filed: Jul. 20, 1999

(86) PCT No.: PCT/CA99/00653

§ 371 Date: Dec. 6, 1999

§ 102(e) Date: Dec. 6, 1999

(87) PCT Pub. No.: WO00/06414

PCT Pub. Date: Feb. 10, 2000

(51) Int. Cl.$^7$ .................................................. B60N 2/22
(52) U.S. Cl. ............................................................ 297/367
(58) Field of Search .............................................. 297/367

(56) References Cited

U.S. PATENT DOCUMENTS

| | | | |
|---|---|---|---|
| 3,737,946 | 6/1973 | Giuliani | 297/367 X |
| 3,879,802 | 4/1975 | Werner | 297/367 X |
| 3,953,069 | 4/1976 | Tamura et al. | 297/367 |
| 3,958,828 | 5/1976 | Ishida et al. | 297/367 X |
| 4,087,885 | 5/1978 | Gilllentine | 297/367 X |
| 4,143,905 | 3/1979 | Hensel et al. | |
| 4,184,714 | 1/1980 | Courtois | 297/370 |
| 4,348,050 | 9/1982 | Letournoux et al. | 297/367 X |
| 4,634,181 | 1/1987 | Pipon | 297/365 X |
| 4,770,464 | 9/1988 | Pipon et al. | 297/367 |
| 4,919,004 | 4/1990 | Nagano | |
| 5,096,261 | 3/1992 | Baloche | 297/362 |
| 5,161,856 | 11/1992 | Nishino | 297/367 |
| 5,216,936 | 6/1993 | Baloche | 297/367 |
| 5,451,096 | 9/1995 | Droulon | 297/362 |
| 5,496,225 | 3/1996 | Droulon | |
| 5,536,217 | 7/1996 | Droulon | 297/327 X |
| 5,590,931 | 1/1997 | Fourrey et al. | 297/367 X |

(List continued on next page.)

FOREIGN PATENT DOCUMENTS

| | | |
|---|---|---|
| 0024976 | 11/1983 | (EP) . |
| 502774 | 11/1995 | (EP) . |
| 0770514 | 5/1997 | (EP) . |
| 0691238 | 10/1997 | (EP) . |
| 1347823 | 11/1963 | (FR) . |
| 2225783 | 11/1974 | (FR) . |
| 2117440 | 10/1983 | (GB) . |
| 594226 | 3/1959 | (IT) . |

*Primary Examiner*—Peter M. Cuomo
*Assistant Examiner*—Rodney B. White
(74) *Attorney, Agent, or Firm*—Howard & Howard

(57) ABSTRACT

A recliner assembly for an automotive seat has a seat cushion and a seat back pivotally mounted to the seat cushion. The recliner assembly includes a housing and a cover plate encapsulating the housing. The cover plate has an outer ring with a plurality of teeth. Three pawls are mounted within the housing. The pawls each have a toothed surface and are moveable between a locked position and an unlocked position. With the pawls in the locked position, the toothed surfaces engage the teeth of the cover plate to secure the seat back relative to the seat cushion. With the pawls in the unlocked position, the toothed surfaces are spaced from the teeth of the cover plate to allow movement of the seat back relative to the seat cushion. Three pivot protrusions extend from the housing for providing a pivot point for each of the pawls. Three guide protrusions similarly extend from the housing for guiding each of the pawls between the engaged and disengaged positions. A cam is movably mounted relative to the housing and has three lobes for engagement with the pawls and moving the pawls between the engaged and disengaged positions. A single substantially spiral spring has a first end engaging one of the lobes of the cam and a second end engaging a guide protrusion for continuously biasing the lobes of the cam toward engagement with the pawls which continuously biases the toothed surfaces of the pawls toward engagement with the teeth of the cover plate.

39 Claims, 4 Drawing Sheets

U.S. PATENT DOCUMENTS

| | | | |
|---|---|---|---|
| 5,681,086 | 10/1997 | Baloche | 297/367 |
| 5,692,589 | 12/1997 | Beguin | 297/367 |
| 5,725,452 | 3/1998 | Doulon et al. | 297/362 |
| 5,755,491 | 5/1998 | Baloche et al. | 297/367 X |
| 5,779,313 | 7/1998 | Rohee | 297/367 |
| 5,788,325 | 8/1998 | Ganot | 297/367 X |
| 5,820,219 | 10/1998 | Rohee | 297/367 |
| 5,829,218 | 10/1998 | Baloche et al. | 297/367 X |
| 5,857,746 | * 1/1999 | Barrere et al. | 297/367 |
| 5,984,413 | * 11/1999 | Baloche et al. | 297/367 |
| 6,007,152 | * 12/1999 | Kojima et al. | 297/367 |
| 6,007,153 | * 12/1999 | Benoit et al. | 297/367 X |
| 6,082,821 | * 7/2000 | Baloche et al. | 297/367 X |
| 6,092,874 | * 7/2000 | Kojima et al. | 297/367 |
| 6,120,098 | 9/2000 | Magyar et al. | 297/367 |
| 6,164,723 | * 12/2000 | Ganot | 297/367 X |

* cited by examiner

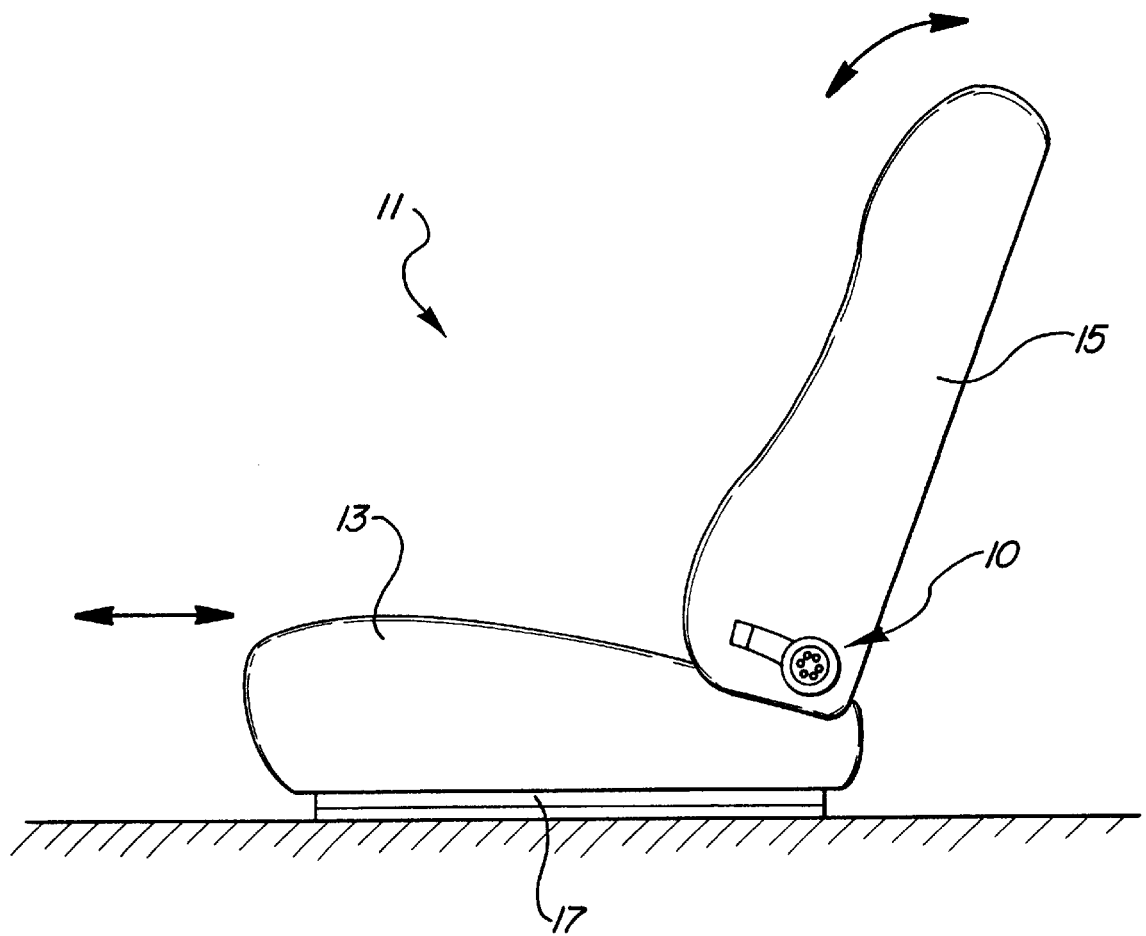

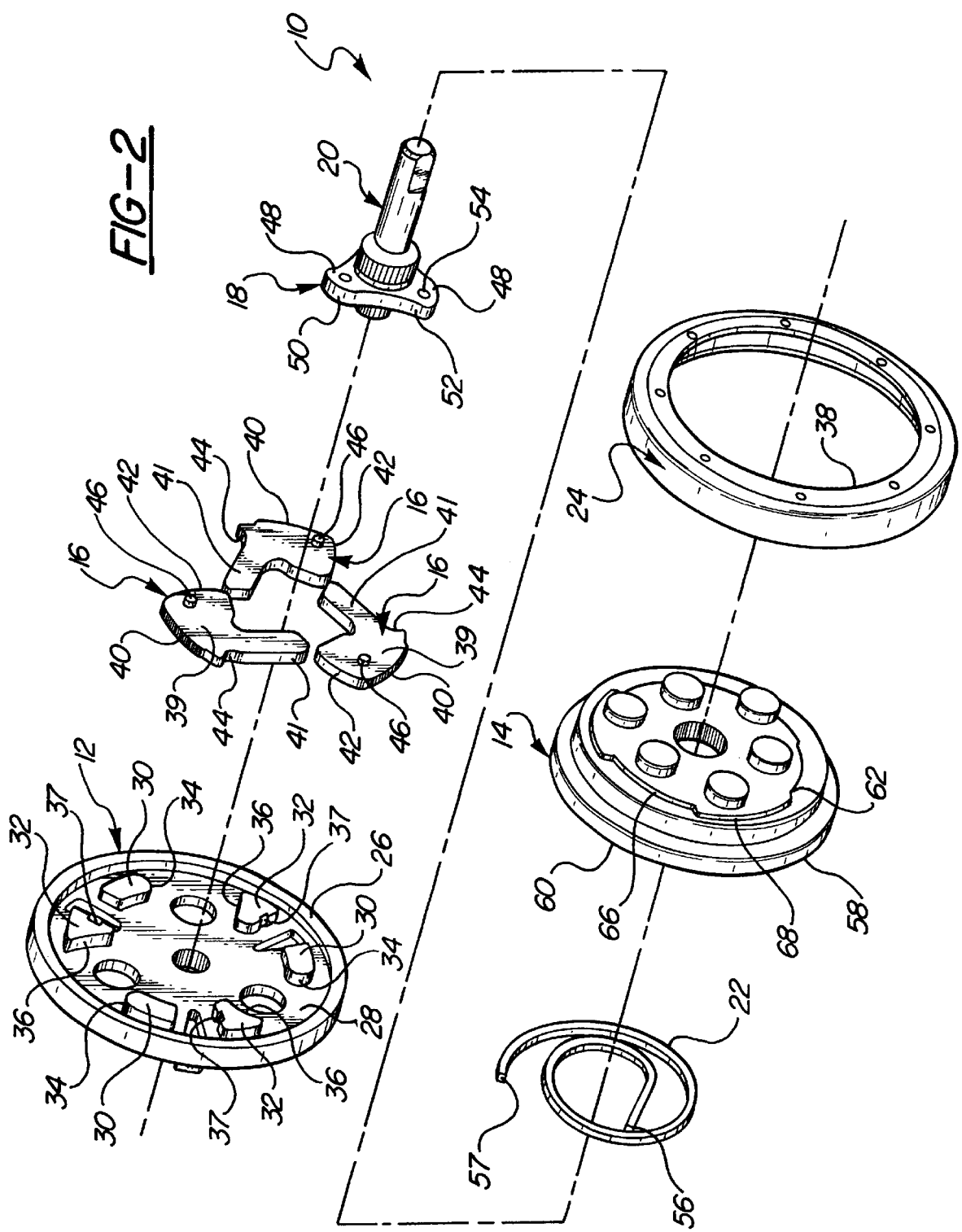

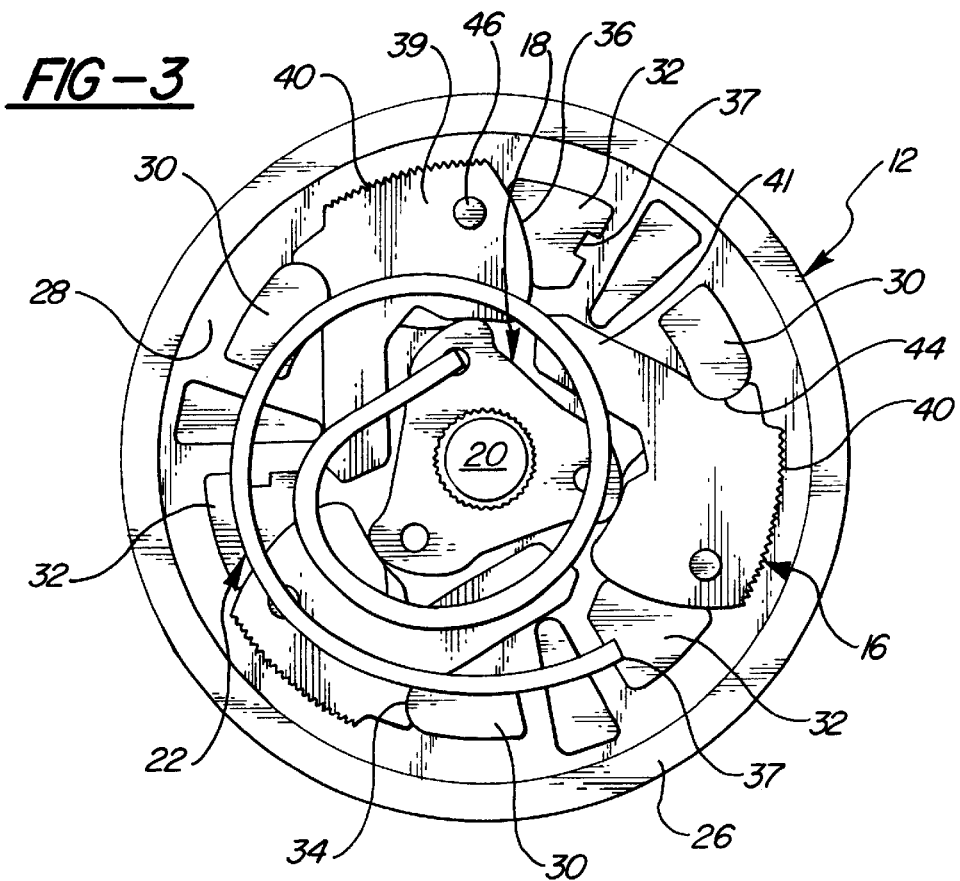
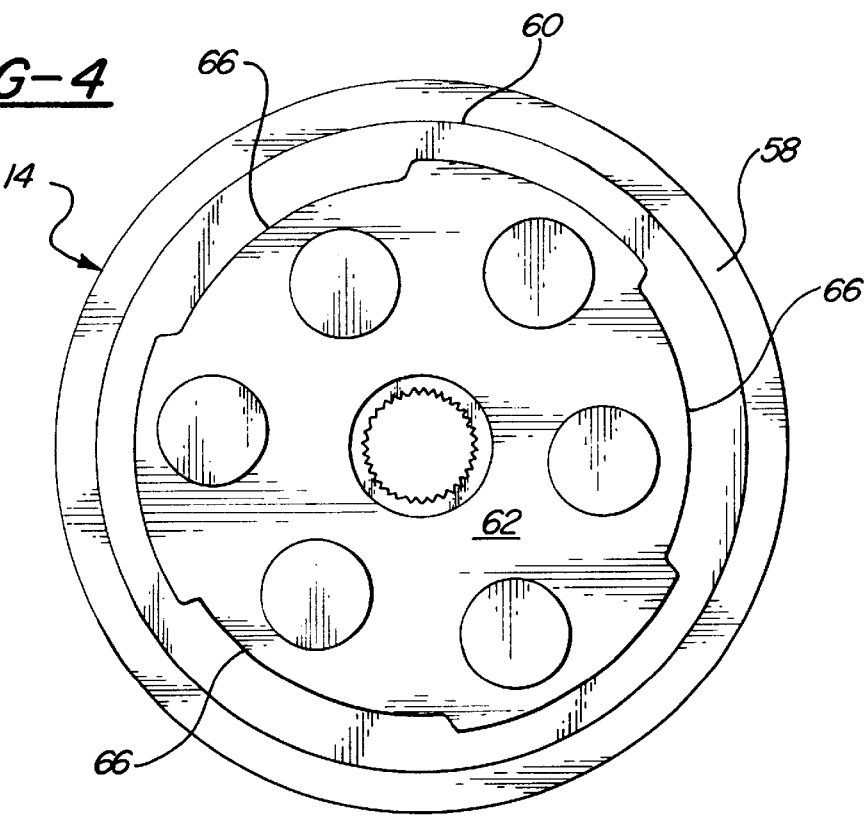

RECLINER ASSEMBLY

FIELD OF THE INVENTION

The subject invention relates to automotive seat recliners for securing and releasing a seat back relative to a seat cushion.

DESCRIPTION OF THE PRIOR ART

Automotive seat back recliners and in particular ring type recliners are well known in the seating art and are frequently used to hingedly connect a seat back to a seat cushion. The ring recliner allows the seat back to incrementally recline relative to the seat cushion. Ring recliners typically include a cam moving a pawl into and out of engagement with a ring which has an inner surface and a plurality of teeth disposed thereon. Many of the ring recliners, however, use a multitude of parts and springs which create an overly complex and expensive design. Although complicated, the prior art ring recliners have been adequate in adjusting the seat assemblies when used in a four door vehicle.

In many two door vehicles, the seat assembly must be able to "dump" forward to allow access to a rear row seat. The prior art ring recliners discussed above do not permit the seat assembly to move into this dumped position. One solution has been contemplated by the prior art and is disclosed in U.S. Pat. No. 5,590,931. The '931 patent utilizes an intermediate plate where a recline mechanism is provided on one side of the plate while a dump mechanism is provided on an opposite side of the plate. The intermediate plate and separate dump mechanism add to the complexity and cost of this prior art recliner.

Accordingly, there is a need for a seat back recliner which is of a relatively simple design and allows the seat back to incrementally recline and dump forward relative to the seat cushion.

SUMMARY OF THE INVENTION AND ADVANTAGES

The disadvantages of the prior art may be overcome by providing a relatively simple ring recliner which utilizes only a single spring and allows the seat back to incrementally recline relative to the seat cushion. The subject invention also allows the seat back to dump forward relative to the seat cushion for allowing access to a rear row seat.

According to one aspect of the invention, there is provided a recliner assembly for an automotive seat having a seat cushion and a seat back pivotally mounted to the seat cushion. The recliner assembly comprises a housing having an inner surface and adapted for mounting to the seat back. A cover plate encapsulates at least a portion of the housing and has an inner ring with a plurality of teeth disposed thereon. A plurality of pawls are mounted within the inner surface of the housing. The pawls each have a toothed surface and are moveable between a locked position and an unlocked position. With the pawls in the locked position, the toothed surfaces engage the teeth of the cover plate to secure the seat back relative to the seat cushion. With the pawls in the unlocked position, the toothed surfaces are spaced from the teeth of the cover plate to allow movement of the seat back relative to the seat cushion. A plurality of pivot protrusions extend from the inner surface for providing a pivot point for each of the pawls. A plurality of guide protrusions similarly extend from the inner surface for guiding each of the pawls between the engaged and disengaged positions. A cam is movably mounted relative to the housing and has a plurality of lobes for selective engagement with the pawls and selectively moving the pawls between the engaged and disengaged positions. A single substantially spiral spring has first and second ends with the first end engaging one of the lobes of the cam and the second end engaging the inner surface of the housing for continuously biasing the lobes of the cam toward the engagement with the pawls which continuously biases the toothed surfaces of the pawls toward engagement with the teeth of the cover plate.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic side view of an automotive seat assembly incorporating the subject invention;

FIG. 2 is an exploded view of a recliner assembly of the present invention;

FIG. 3 is a side elevational view of an inner surface of a housing of the recliner assembly of FIG. 2;

FIG. 4 is a side elevational view of a cover plate;

DETAILED DESCRIPTION OF THE PREFERRED EMBODIMENT

Figure 5:
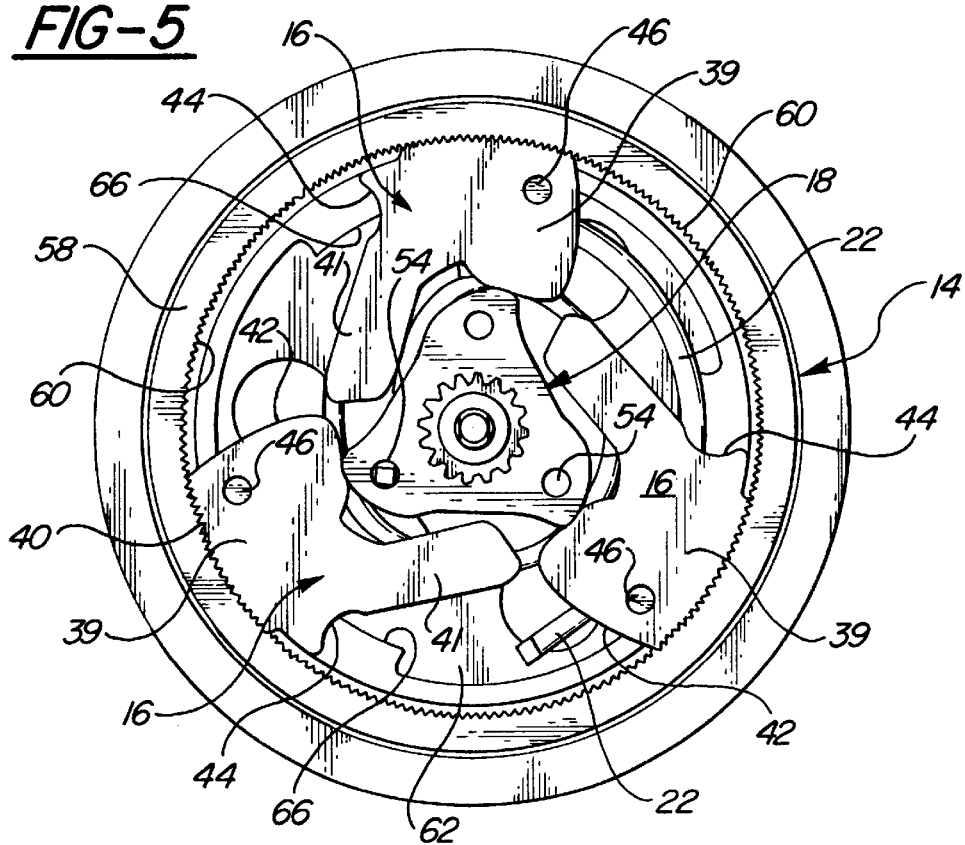
FIG. 5 is a side elevational view of the inner surface of the cover plate incorporating the reclining mechanism of FIG. 2.

Referring to the Figures, wherein like numerals indicate like or corresponding parts throughout the several views, an automotive seat assembly is generally shown at 11 in FIG. 1. The seat assembly 11 includes a seat cushion 13 and a seat back 15 pivotally mounted to the seat cushion 13. As appreciated, the seat assembly 11 is shown schematically and may be of any suitable design or configuration. A recliner assembly is generally shown at 10 for providing a reclining feature for the seat back 15. The recliner assembly 10 of the subject invention allows the seat back 15 to incrementally recline relative to the seat cushion 13 or "dump" against the seat cushion 13. The dumping feature pivotally moves the seat back 15 forward and downward against the seat cushion 13 with a single turn of the recliner assembly 10. The seat assembly 11 may also move forward and rearward on a conventional seat track mechanism 17. The seat track mechanism 17 also allows the entire seat assembly 11 to automatically move to the forward most position when the seat back 15 is dumped against the seat cushion 13. The reclining features of the seat back 15 will be discussed in greater detail below with reference to the specific operation of the recliner assembly 10.

Referring to FIGS. 2 through 5, the recliner assembly 10 comprises a housing 12 having an inner surface 28 and adapted for mounting to the seat back 15. The housing 12 preferably has a cup shaped configuration with an annular rim 26. As appreciated, the housing 12 may be mounted by any suitable means to any suitable device within the seat back 15. A cover plate 14 encapsulates at least a portion of the housing 12 and has an outer ring 58 with a plurality of teeth 60 disposed thereon. The outer ring 58 and teeth 60 are best shown in FIGS. 4 and 5.

Figure 6:
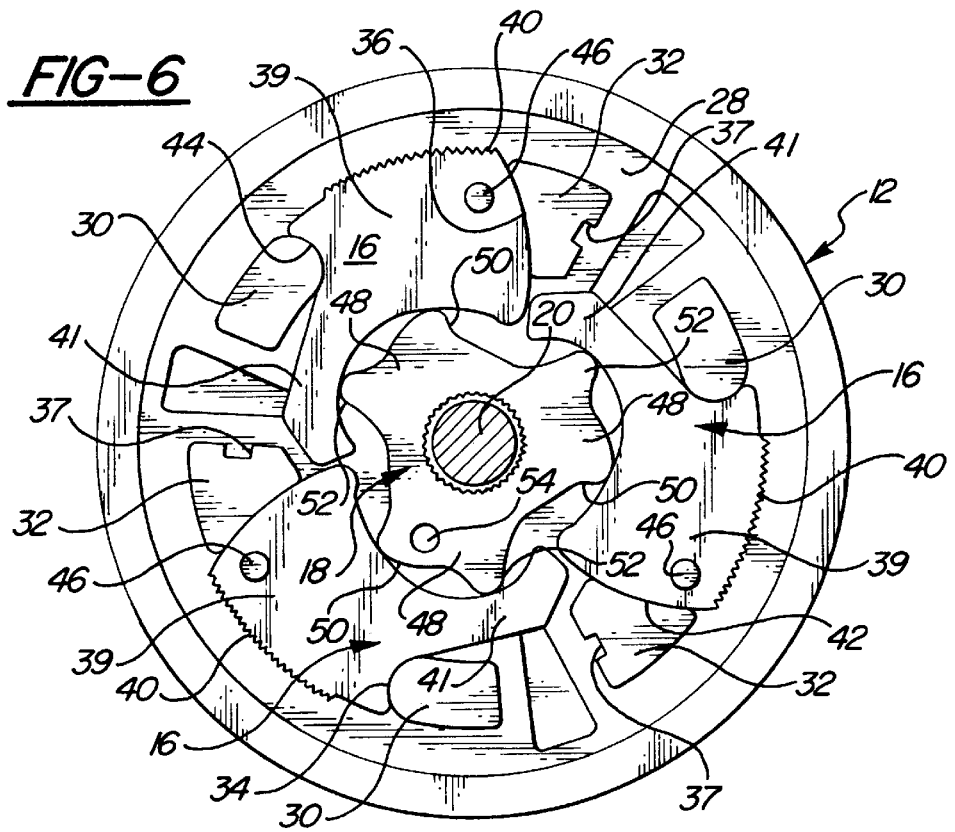
FIG. 6 is an alternative embodiment of the recliner assembly.

A plurality of pawls 16 are mounted within the inner surface 28 of the housing 12 between the housing 12 and the cover plate 14. The pawls 16 each have a toothed surface 40 and are moveable between a locked position and an unlocked position. With the pawls 16 in the locked position, the toothed surfaces 40 engage the teeth 60 of the cover plate 14 to secure the seat back 15 relative to the seat cushion 13. With the pawls 16 in the unlocked position, the toothed surfaces 40 are spaced from the teeth 60 of the cover plate 14 to allow movement of the seat back 15 relative to the seat cushion 13. Preferably, the plurality of pawls 16 include three independently pivoting pawls 16. Even more preferably, each of the pawls 16 have a substantially club shaped configuration with a main body portion 39 and an extending arm 41. As appreciated, there may be any suitable number of pawls 16 of any suitable size or configuration so long as the cover plate 14 can be secured to the housing 12. As discussed in greater detail below, one such alternative configuration for the pawls 16 is shown in FIG. 6.

A plurality of pivot protrusions 30 extend from the inner surface 28 of the housing 12 for providing a pivot point for each of the pawls 16. Specifically, the pivot protrusions 30 include an arcuate pivot face 34 on a leading side. A plurality of guide protrusions 32 similarly extend from the inner surface 28 of the housing 12 for guiding each of the pawls 16 between the engaged and disengaged positions. Specifically, the guide protrusions 32 include an arcuate face 36 on a trailing side and a notch 37 on the leading side. There are preferably three pivot 30 and guide 32 protrusions which are machined into the stock forming the housing 12. Alternatively, the housing 12 and protrusions 30, 32 may be stamped.

The inner diameter of the cover plate 14 are sized such that the housing 12 nestingly receives the cover plate 14 in a face to face relation. The protrusions 30, 32 are also spaced from the outer annular rim 26 of the housing 12 such that the cover plate 14 is nestingly received.

The toothed surfaces 40 of the pawls 16 are disposed on the main body portions 39 of the pawls 16. The main body portions 39 of the pawls 16 also include a curved leading face 42 complementary in configuration with a portion of the guide protrusions 32 for guiding the pivotal movement of the pawls 16. Specifically, the curved leading face 42 of the pawls 16 mates with the arcuate face 36 of the guide protrusions 32. The curved 42 and arcuate 36 faces present a stop surface defining the engaged position. The arms 41 engage a corresponding guide protrusion 32 when the pawl 16 is pivoted to the disengaged position. In other words, the arms 41 limit the outwardly pivotal movement of the pawls 16.

The main body portions 39 of the pawls 16 further include a notched trailing face 44 complementary in configuration with a portion of the pivot protrusions 30 for defining the pivot point of the pawls 16. Specifically, the notched trailing face 44 of the pawls 16 mates with the arcuate pivot face 34 of the pivot protrusions 30. Accordingly, the pawls 16 are movably received between a corresponding pivot protrusion 30 and guide protrusion 32.

A cam 18 is movably mounted relative to the housing 12 and has a plurality of lobes 48 for selective engagement with the pawls 16 and selectively moving the pawls 16 between the engaged and disengaged positions. The cam 18 is positioned against the housing 12 in the center of the pawls 16. Preferably, the plurality of lobes 48 of the cam 18 include three lobes 48 corresponding to the three pawls 16. As discussed above, there may be any number of pawls 16 as desired which would correlate to the appropriate number of lobes 48. The arms 41 of the pawls 16 engage a corresponding lobe 48 of the cam 18 for facilitating the movement of the pawls 16. Specifically, the lobes 48 of the cam include a leading edge 50 selectively engaging the main body portion 39 and a trailing edge 52 selectively engaging the arm 41. The lobes 48 have a generally swept shape with the leading edge 50 merging smoothly with the trailing edge 52. The leading edge 50 of the lobes 48 engages the main body portion 39 when the pawls 16 are to engage the teeth 60 of the cover plate 14, i.e. a locking position. Correspondingly, the trailing edge 52 of the lobes 48 engages the arms 41 of the pawls 16 when the pawls 16 are to disengage the teeth 60 of the cover plate 14, i.e. an unlocked position. As appreciated, the specific configuration of the cam 18 may be of any design so long as the pawls 16 can be effectively manipulated. One such alternative design for the lobes 48 of the cam 18 is shown in FIG. 6 and discussed in greater detail below.

The cam 18 is mounted to a shaft 20 for rotation therewith. The shaft 20 in turn extends through corresponding bores (not numbered) in the center of the housing 12 and cover plate 14. This in turn centers the cam 18 relative to the housing 12 and cover plate 14.

A single substantially spiral spring 22 has first 56 and second 57 ends with the first end 56 engaging one of the lobes 48 of the cam 18 and the second end 57 engaging the inner surface 28 of the housing 12. The spiral spring 22 continuously biases the lobes 48 of the cam 18 toward the engagement with the pawls 16 for continuously biasing the toothed surfaces 40 of the pawls 16 toward engagement with the teeth 60 of the cover plate 14. Preferably, each lobe 48 of the cam 18 includes an aperture 54 wherein the first end 56 of the spring 22 engages a corresponding aperture 54. The second end 57 of the spiral spring 22 preferably engages one of the protrusions 30, 32 for providing the continuous biasing of the cam 18. Even more preferably, the second end 57 of the spiral spring 22 engages the notch 37 within one of the guide protrusions 32. The aperture 54 within the cam 18 and the notch 37 within the guide protrusion 32 locks the spiral spring 22 in a continuously biased position. The spiral spring 22 may be made of any suitable material and have any desired biasing force so long as the cam 18 can effectively move the pawls 16 in and out of engagement with the teeth 60. The design of having a single spiral spring 22 is particularly advantageous over the prior art because of its simplicity in operation and installation.

An axially extending pin 46 extends from each of the main body portions 39 of the pawls 16. The cover plate 14 has an inner surface 62 with a plurality of radially circumferential extending detents 66 which are best shown in FIGS. 4 and 5. The detents 66 correlate with the pins 46. Specifically, the detents 66 selectively engage the pins 46 of the pawls 16 for pushing the pins 46 and the toothed surfaces 40 of the pawls 16 out of engagement with the teeth 60 of the cover plate 14 irrespective of the position of the cam 18. In other words, the cover plate 14 may be rotated independently from the shaft 20 and cam 18 to move the detents 66 into engagement with the pins 46. Preferably, there are three radially extending detents 66 having a height which is approximately equal to the height of the pins 46 of the three pawls 16. In addition, the detents 66 are spaced equidistantly about the cover plate 14 such that each pin 46 engages and disengages the detents 66 simultaneously. The detents 66 and pins 46 are provided for holding the recliner assembly 10 in the reclined position during the dumping of the seat assembly 11. As appreciated, the dumping feature is primarily used on two door vehicles. Hence, if the recliner assembly of the subject invention was utilized in a four door vehicle, the pins 46 would be eliminated. All other aspects of the recliner assembly 10 would be substantially the same.

A retaining ring 24 encompasses at least a portion of the housing 12 and the cover plate 14 for securing the cover plate 14 to the housing 12. The retaining ring 24 is preferably cup shaped having a central opening 38.

Referring to FIG. 6, an alternative embodiment of the recliner assembly 10 is shown. The primary differences between this embodiment and the primary embodiment discussed above relate to the configuration of the cam 18 and pawls 16. The arms 41 of the pawls 16 have a increasingly curved design which curves inward toward the cam 18. The main body portions 39 of the pawls 16 have a bulbous projection (not specifically numbered) disposed at an end opposite to the arms 41. The lobes 48 of the cam 18 have a different configuration with two well defined leading 50 and trailing 52 edges. Specifically, each lobe 48 has two separate projections defining the leading 50 and trailing 52 edges. The cam 18 also has only one aperture 54. The remaining aspects of the pawls 16, such as the toothed surface 40, the arcuate pivot face 34, arcuate face 36 and pin 46 are substantially the same. Further, the remaining components, such as the housing 12, pivot protrusions 30, guide protrusions 32 and shaft 20 are also substantially the same.

Once assembled, the pawls 16 are pivotal between the locked and unlocked positions. In the locked position the toothed surface 40 of the pawls 16 engages the teeth 60 of the cover plate 14 which secures the seat back 15 to the seat cushion 13. To incrementally move the seat back 15 relative to the seat cushion 13 the recliner assembly 10 must be actuated. Specifically, the shaft 20 and cam 18 are rotated. The shaft 20 may be rotated by any suitable handle as is known in the art. The shaft 20 is rotated in such a direction as to rotate the trailing edge 52 of the lobes 48 to engage the arms 41 of the pawls 16 and pivot the toothed surface 40 of the pawls 16 out of engagement with the teeth 60 of the cover plate 14. Specifically, the notched trailing face 44 of the pawls 16 pivots relative to the arcuate pivot face 34 of the pivot protrusions 30. Similarly, the curved leading face 42 of the pawls 16 slides relative to the arcuate face 36 of the guide protrusions 32. As discussed above, the arms 41 limit the outwardly pivotal movement of the pawls 16 toward the disengaged position. Once disengaged, the seat back 15 may be adjusted as desired. The subject invention provides for 60° of incremental adjustment. If the pins 46 are removed, as in a four door vehicle, there is 120° of incremental adjustment.

Once the desire position is achieved, the rotational force imparted onto the shaft 20 is released. In other words, the handle is released. The spiral spring 22 automatically rotates the cam 18 and shaft 20 back to the locked position. Specifically, the leading edge 50 of the lobes 48 engage the main body portion 39 and push the toothed surfaces 40 of the pawls 16 back into engagement with the teeth 60 of the cover plate 14. The recliner assembly 10 has now returned to the original locked position.

To dump the seat back 15 forward and downward relative to the seat cushion 13 the recliner assembly 10 is again actuated. Specifically, the cover plate 14 is rotated, normally under the bias of the spring 22 biasing the seat back 15 forwardly. Sufficient rotation of the cover plate 14 engages the detents 66 with the corresponding pins 46 on the pawls 16. The pins 46 move inward along the surface of the detents 66. This engagement pushes the toothed surfaces 40 of the pawls 16 out of engagement with the teeth 60 of the cover plate 14. As discussed above this disengagement occurs irrespective of the position of the cam 18. As appreciated, the spiral spring 22 is continuously biasing the cam 18 toward the locked position; however, the detents 66 prevent any movement of the pawls 16. The rotation of the cover plate 14 remains in this position without any additional force being applied. In other words, once a user sufficiently rotates the cover plate 14 to disengage the pawls 16, the user no longer needs to touch the cover plate 14. The disengagement of the pawls 16 will automatically remain. The seat back 15 may now be dumped toward the seat cushion 13 without any additional operation of the recliner assembly 10. The preferred design allows for approximately 60° of dumping. To return the seat back 15 to the upright and locked position, the user pushes the seat back 15 rearward and rotates the cover plate 14 until the pins 46 are out of alignment with the detents 66. The pawls 16 now have freedom to again pivot. The spiral spring 22 then biases the cam 18 and pawls 16 back to the original locked position. The recliner assembly 10 has again returned to the original locked position.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A recliner assembly for an automotive seat having a seat cushion and a seat back pivotally mounted to said seat cushion, said recliner assembly comprising;

a housing having an inner surface and adapted for mounting to said seat back, a cover plate for encapsulating at least a portion of said housing and having an outer ring with a plurality of teeth disposed thereon, a plurality of pawls mounted within said inner surface of said housing between said housing and said cover plate, said pawls each having a toothed surface and moveable between a locked position with said toothed surfaces engaging said teeth of said cover plate to secure said seat back relative to said seat cushion, and an unlocked position with said toothed surfaces spaced from said teeth of said cover plate to allow movement of said seat back relative to said seat cushion, a plurality of pivot protrusions extending from said inner surface for providing a pivot point for each of said pawls, a plurality of guide protrusions extending from said inner surface for guiding each of said pawls between said engaged and disengaged positions, a cam movably mounted relative to said housing and having a plurality of lobes for selective engagement with said pawls and selectively moving said pawls between said engaged and disengaged positions, and a single substantially spiral spring having first and second ends with said first end engaging one of said lobes of said cam and said second end engaging one of said protrusions for continuously biasing said lobes of said cam toward said engagement with said pawls for continuously biasing said toothed surfaces of said pawls toward engagement with said teeth of said cover plate.

2. An assembly as set forth in claim 1 wherein said second end of said single spiral spring engages one of said guide protrusions for providing said continuous biasing of said cam.

3. An assembly as set forth in claim 1 wherein said plurality of pawls includes three independently pivoting pawls.

4. An assembly as set forth in claim 3 wherein each of said pawls have a substantially club shaped configuration with a main body portion and an arm.

5. An assembly as set forth in claim 4 wherein said arms of said pawls each engage a corresponding lobe of said cam for facilitating said movement of said pawls.

6. An assembly as set forth in claim 5 wherein said toothed surfaces of said pawls are disposed on said main body portions of said pawls.

7. An assembly as set forth in claim 6 wherein said main body portions of said pawls include a curved leading face complementary in configuration with a portion of said guide protrusions for guiding said pivotal movement of said pawls.

8. An assembly as set forth in claim 7 wherein said main body portions of said pawls include a notched trailing face complementary in configuration with a portion of said pivot protrusions for defining said pivot point of said pawls.

9. An assembly as set forth in claim 4 wherein said plurality of lobes of said cam include three lobes corresponding to said three pawls.

10. An assembly as set forth in claim 9 wherein said lobes of said cam include a leading edge selectively engaging said main body portion and a trailing edge selectively engaging said arm.

11. An assembly as set forth in claim 10 further including an axially extending pin extending from each of said main body portions of said pawls.

12. An assembly as set forth in claim 11 wherein said cover plate has an inner surface with a plurality of radially circumferential extending detents selectively engaging said pins for pushing said pins and said toothed surfaces of said pawls out of engagement with said teeth of said cover plate irrespective of the position of said cam.

13. An assembly as set forth in claim 12 wherein said radially extending detents have a height which is approximately equal to the height of said pins of said pawls.

14. An assembly as set forth in claim 9 further including a retaining ring encompassing at least a portion of said housing and said cover plate for securing said cover plate to said housing.

15. A recliner assembly for an automotive seat having a seat cushion and a seat back pivotally mounted to said seat cushion, said recliner assembly comprising;
 a housing having an inner surface and adapted for mounting to said seat back,
 a cover plate for encapsulating at least a portion of said housing and having an outer ring with a plurality of teeth disposed thereon,
 a plurality of pawls mounted within said inner surface of said housing between said housing and said cover plate, said pawls each having a toothed surface and a substantially club shaped configuration with a main body portion and an arm, said pawls being moveable between a locked position with said toothed surfaces engaging said teeth of said cover plate to secure said seat back relative to said seat cushion, and an unlocked position with said toothed surfaces spaced from said teeth of said cover plate to allow movement of said seat back relative to said seat cushion,
 a plurality of pivot protrusions extending from said inner surface for providing a pivot point for each of said pawls,
 a plurality of guide protrusions extending from said inner surface for guiding each of said pawls between said engaged and disengaged positions,
 an axially extending pin extending from each of said main body portions of said pawls for selective engagement with said cover plate,
 a cam movably mounted relative to said housing and having a plurality of lobes for selective engagement with said pawls and selectively moving said pawls between said engaged and disengaged positions, and
 a single substantially spiral spring having first and second ends with said first end engaging one of said lobes of said cam and said second end engaging said inner surface of said housing for continuously biasing said lobes of said cam toward said engagement with said pawls for continuously biasing said toothed surfaces of said pawls toward engagement with said teeth of said cover plate.

16. An assembly as set forth in claim 15 wherein said second end of said single spiral spring engages one of said protrusions for providing said continuous biasing of said cam.

17. An assembly as set forth in claim 15 wherein said arms of said pawls each engage a corresponding lobe of said cam for facilitating said movement of said pawls.

18. An assembly as set forth in claim 15 wherein said toothed surfaces of said pawls are disposed on said main body portions of said pawls.

19. An assembly as set forth in claim 15 wherein said main body portions of said pawls include a curved leading face complementary in configuration with a portion of said guide protrusions for guiding said pivotal movement of said pawls.

20. An assembly as set forth in claim 15 wherein said main body portions of said pawls include a notched trailing face complementary in configuration with a portion of said pivot protrusions for defining said pivot point of said pawls.

21. An assembly as set forth in claim 15 wherein said lobes of said cam include a leading edge selectively engaging said main body portion and a trailing edge selectively engaging said arm.

22. An assembly as set forth in claim 15 further including an axially extending pin extending from each of said main body portions of said pawls.

23. An assembly as set forth in claim 22 wherein said cover plate has an inner surface with a plurality of radially circumferential extending detents selectively engaging said pins for pushing said pins and said toothed surfaces of said pawls out of engagement with said teeth of said cover plate irrespective of the position of said cam.

24. An assembly as set forth in claim 23 wherein said radially extending detents have a height which is approximately equal to the height of said pins of said pawls.

25. A recliner assembly for an automotive seat having a seat cushion and a seat back pivotally mounted to said seat cushion, said recliner assembly comprising;
 a housing having an inner surface and adapted for mounting to said seat back,
 a cover plate for encapsulating at least a portion of said housing and having an outer ring with a plurality of teeth disposed thereon,
 a plurality of pawls mounted within said inner surface of said housing between said housing and said cover plate, said pawls each having a toothed surface and moveable between a locked position with said toothed surfaces engaging said teeth of said cover plate to secure said seat back relative to said seat cushion, and an unlocked position with said toothed surfaces spaced from said teeth of said cover plate to allow movement of said seat back relative to said seat cushion, a plurality of pivot protrusions extending from said inner surface for providing a pivot point for each of said pawls, a plurality of guide protrusions extending from said inner surface for guiding each of said pawls between said engaged and disengaged positions, a cam movably mounted relative to said housing and having a plurality of lobes for selective engagement with said pawls and selectively moving said pawls between said engaged and disengaged positions, and a single substantially spiral spring having first and second ends with said first end engaging one of said lobes of said cam and said second end spiraling outward toward said outer ring of said cover plate and at least partially overlaying said cam and at least one of said pawls to engage said inner surface of said housing for creating a substantially compact recliner assembly with said spiral spring continuously biasing said lobes of said cam toward said engagement with said pawls for continuously biasing said toothed surfaces of said pawls toward engagement with said teeth of said cover plate.

26. An assembly as set forth in claim 25 wherein said spiral spring provides a substantially uniform biasing force to said cam throughout an entire pivotal movement of the seat back such that said spiral spring continuously biases said lobes of said cam toward said engagement with said pawls in a substantially uniform manner.

27. An assembly as set forth in claim 25 wherein said second end of said single spiral spring engages one of said protrusions for providing said continuous biasing of said cam.

28. An assembly as set forth in claim 25 wherein said plurality of pawls includes three independently pivoting pawls.

29. An assembly as set forth in claim 28 wherein said plurality of lobes of said cam include three lobes corresponding to said three pawls.

30. An assembly as set forth in claim 25 wherein each of said pawls have a substantially club shaped configuration with a main body portion and an arm.

31. An assembly as set forth in claim 30 wherein said arms of said pawls each engage a corresponding lobe of said cam for facilitating said movement of said pawls.

32. An assembly as set forth in claim 30 wherein said toothed surfaces of said pawls are disposed on said main body portions of said pawls.

33. An assembly as set forth in claim 30 wherein said main body portions of said pawls include a curved leading face complementary in configuration with a portion of said guide protrusions for guiding said pivotal movement of said pawls.

34. An assembly as set forth in claim 30 wherein said main body portions of said pawls include a notched trailing face complementary in configuration with a portion of said pivot protrusions for defining said pivot point of said pawls.

35. An assembly as set forth in claim 30 wherein said lobes of said cam include a leading edge selectively engaging said main body portion and a trailing edge selectively engaging said arm.

36. An assembly as set forth in claim 30 further including an axially extending pin extending from each of said main body portions of said pawls.

37. An assembly as set forth in claim 36 wherein said cover plate has an inner surface with a plurality of radially circumferential extending detents selectively engaging said pins for pushing said pins and said toothed surfaces of said pawls out of engagement with said teeth of said cover plate irrespective of the position of said cam.

38. An assembly as set forth in claim 37 wherein said radially extending detents have a height which is approximately equal to the height of said pins of said pawls.

39. An assembly as set forth in claim 25 further including a retaining ring encompassing at least a portion of said housing and said cover plate for securing said cover plate to said housing.

* * * * *